US012694260B2

(12) United States Patent
Fishel et al.

(10) Patent No.: US 12,694,260 B2
(45) Date of Patent: Jul. 28, 2026

(54) COMPRESSION OF KERNEL DATA FOR NEURAL NETWORK OPERATIONS

(71) Applicant: Apple Inc., Cupertino, CA (US)

(72) Inventors: Liran Fishel, Raanana (IL); Sung Hee Park, Cupertino, CA (US); Christopher L. Mills, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 978 days.

(21) Appl. No.: 17/473,454

(22) Filed: Sep. 13, 2021

(65) Prior Publication Data

US 2022/0019875 A1    Jan. 20, 2022

Related U.S. Application Data

(63) Continuation of application No. 15/971,657, filed on May 4, 2018, now Pat. No. 11,120,327.

(51) Int. Cl.
*G06N 3/04* (2023.01)
(52) U.S. Cl.
CPC ...................................... *G06N 3/04* (2013.01)
(58) Field of Classification Search
CPC ........................................................ G06N 3/04
See application file for complete search history.

(56) References Cited

U.S. PATENT DOCUMENTS

| | | |
|---|---|---|
| 2014/0344194 A1 | 11/2014 | Lee et al. |
| 2016/0358070 A1 | 12/2016 | Brothers et al. |
| 2017/0011288 A1 | 1/2017 | Brothers et al. |
| 2018/0046903 A1* | 2/2018 | Yao ......................... G06N 3/048 |
| 2018/0046916 A1* | 2/2018 | Dally ...................... G06F 7/523 |
| 2019/0197420 A1* | 6/2019 | Singh ....................... G06N 3/04 |

OTHER PUBLICATIONS

Chen, Y. et al, Eyeriss: An Energy-Efficient Reconfigurable Accelerator for Deep Convolutional Neural Networks [online], 2017 [retrieved Mar. 30, 2021]. Retrieved from Internet:<URL:https:// ieeexplore.ieee.org/stamp/stamp.jsp?tp=&arnumber=7738524> (Year: 2017) (Year: 2017).*

(Continued)

*Primary Examiner* — Miranda M Huang
*Assistant Examiner* — Bart I Rylander
(74) *Attorney, Agent, or Firm* — Sterne, Kessler, Goldstein & Fox P.L.L.C.

(57)    ABSTRACT

Embodiments relate to a neural processor circuit that includes a kernel access circuit and multiple neural engine circuits. The kernel access circuit reads compressed kernel data from memory external to the neural processor circuit. Each neural engine circuit receives compressed kernel data from the kernel access circuit. Each neural engine circuit includes a kernel extract circuit and a kernel multiply-add (MAD) circuit. The kernel extract circuit extracts uncompressed kernel data from the compressed kernel data. The kernel MAD circuit receives the uncompressed kernel data from the kernel extract circuit and performs neural network operations on a portion of input data using the uncompressed kernel data.

20 Claims, 13 Drawing Sheets

(56) References Cited

OTHER PUBLICATIONS

Bagherinezhad, H. et al, LCNN: Lookup-based Convolutional Neural Network [online], 2017 [retrieved Mar. 30, 2021]. Retrieved from Internet:<URL:https://openaccess.thecvf.com/content_cvpr_2017/papers/Bagherinezhad_LCNN_Lookup-Based_Convolutional_CVPR_2017_paper.pdf> (Year:2017 (Year: 2017).*

Guan, Y., et al, Using Data Compression for Optimizing FPGA-Base Convolutional Neural Network Accelerators, Retrieved from Internet:<https://link.springer.com/chapter/10.1007/978-3-319-67952-5_2> (Year: 2017).*

Mao, H., et al., Exploring the Regularity of Sparse Structure in Convolutional Neural Networks, Retrieved from Internet: <https://arxiv.org/abs/1705.08922> (Year: 2017).*

Nurvitadhi,E., et al, Can FPGAs Beat GPUs in Accelerating Next-Generation Deep Neural Networks?, Retrieved from Internet:<https://dl.acm.org/doi/abs/10.1145/3020078.3021740> (Year: 2017).*

Han, S., et al, Deep Compression: Comprising Deep Neural Networks with Pruning, Trained Quantization, and Huffman Coding, Retrieved from Internet:<https://arxiv.org/abs/1510.00149> (Year: 2016).*

Bagherinezhad, H. et al., "LCNN: Lookup-based Convolutional Neural Network," 2017 IEEE Conference on Computer Vision and Pattern Recognition (CVPR), Jul. 2017, pp. 7120-7129.

Chen, Y. et al., "Eyeriss: An Energy-Efficient Reconfigurable Accelerator for Deep Convolutional Neural Networks," IEEE Journal of Solid-State Circuits, vol. 52, No. 1, Jan. 2017, pp. 127-138.

Han, S., et al., "Deep Compression: Compressing Deep Neural Networks With Pruning, Trained Quantization and Huffman Coding," ICLR, Feb. 15, 2016, pp. 1-14.

United States Office Action, U.S. Appl. No. 15/971,657, filed Jun. 25, 2021, 21 pages.

United States Office Action, U.S. Appl. No. 15/971,657, filed Apr. 13, 2021, 22 pages.

* cited by examiner

Input Data

| 1 | 0 | 1 | 0 | 1 |
|---|---|---|---|---|
| 0 | 0 | 0 | 0 | 0 |
| 1 | 0 | 1 | 0 | 1 |
| 0 | 0 | 0 | 0 | 0 |
| 1 | 0 | 1 | 0 | 1 |

930

| 1 | 1 | 0 | 1 |
|---|---|---|---|
| 1 | 1 | 0 | 0 |
| 0 | 1 | 1 | 0 |
| 1 | 0 | 1 | 0 |

920

| 1 | 1 | 1 |
|---|---|---|
| 1 | 1 | 1 |
| 1 | 1 | 1 |

910

Full Precision Coefficients

| -0.044 | 0.021 | -0.012 |
|--------|-------|--------|
| 0.022 | -0.030 | 0.001 |
| 0.007 | -0.019 | 0.052 |

Compressed Coefficients

| 0 | 2 | 1 |
|---|---|---|
| 2 | 0 | 1 |
| 2 | 1 | 3 |

LUT

| 0 | -0.040 |
|---|--------|
| 1 | -0.011 |
| 2 | 0.017 |
| 3 | 0.047 |

Decompressed Coefficients

| -0.040 | 0.017 | -0.011 |
|--------|-------|--------|
| 0.017 | -0.040 | -0.011 |
| 0.017 | -0.011 | 0.047 |

*FIG. 11*

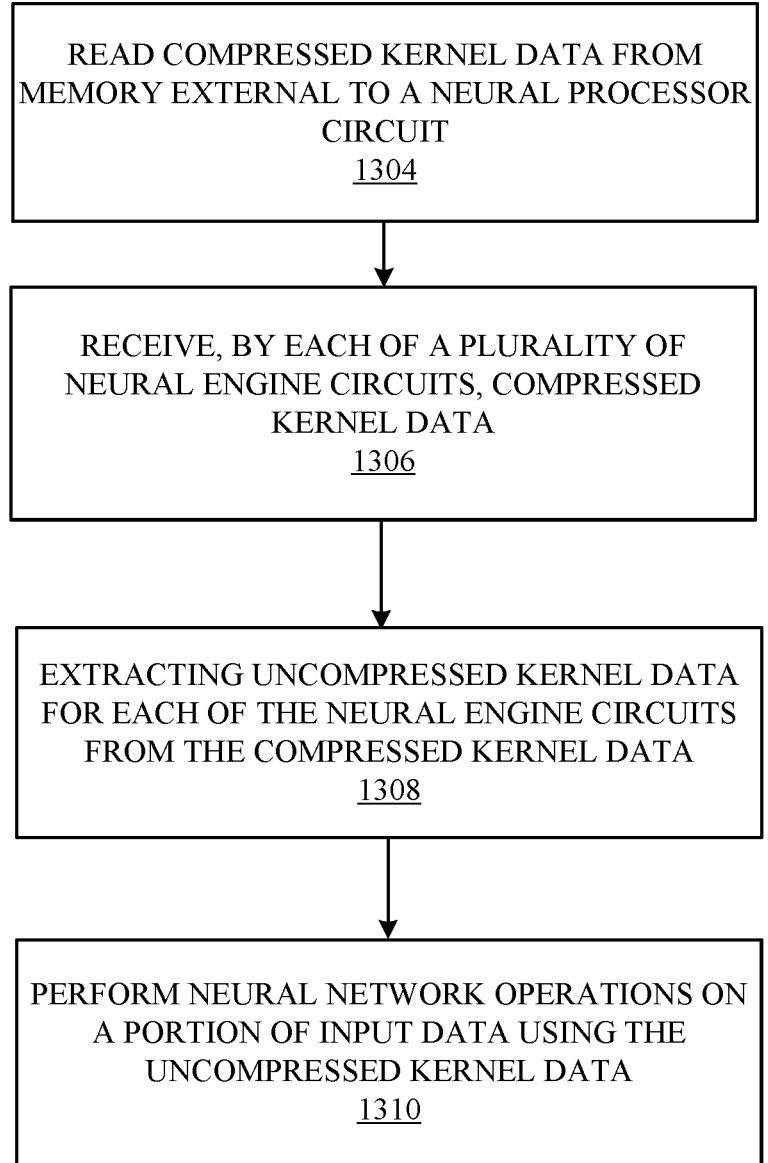

READ COMPRESSED KERNEL DATA FROM
MEMORY EXTERNAL TO A NEURAL PROCESSOR
CIRCUIT
1304

RECEIVE, BY EACH OF A PLURALITY OF
NEURAL ENGINE CIRCUITS, COMPRESSED
KERNEL DATA
1306

EXTRACTING UNCOMPRESSED KERNEL DATA
FOR EACH OF THE NEURAL ENGINE CIRCUITS
FROM THE COMPRESSED KERNEL DATA
1308

PERFORM NEURAL NETWORK OPERATIONS ON
A PORTION OF INPUT DATA USING THE
UNCOMPRESSED KERNEL DATA
1310

*FIG. 13*

COMPRESSION OF KERNEL DATA FOR NEURAL NETWORK OPERATIONS

CROSS-REFERENCE TO RELATED APPLICATIONS

This is a continuation of U.S. patent application Ser. No. 15/971,657, filed on May 4, 2018, which is incorporated by reference herein in its entirety.

BACKGROUND

1. Field of the Disclosure

The present disclosure relates to a circuit for performing convolution neural network and more specifically to using kernel decompression and sparse kernels for more efficient loading of kernel data from external memory.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, number of channels in input data, kernel data to be used, non-linear function to be applied to convolution result, and applying of various post processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural processor circuit that includes a kernel access circuit and multiple neural engines circuits. The kernel access circuit reads compressed kernel data from memory external to the neural processor circuit and sends the compressed kernel data to each neural engine circuit. Each neural engine circuit includes a kernel extract circuit and a multiply-add (MAD) circuit. The kernel extract circuit extracts uncompressed kernel data from the compressed kernel data. The MAD circuit receives the uncompressed kernel data from the kernel extract circuit and performs neural network operations on a portion of input data using the uncompressed kernel data.

In one embodiment, the kernel extract circuit stores representative kernel coefficients of kernels identified by index values as look-up tables in look-up table storage. The kernel extract circuit may reference a lookup table in the look-up table storage to reconstruct uncompressed kernel data corresponding to each of the neural engine circuits. A kernel look-ahead buffer may store the uncompressed kernel data. The kernel look-ahead buffer can send information on locations of kernel coefficients that are zero in the uncompressed kernel data to the MAD circuit before sending kernel coefficient that are non-zero so that the MAD circuit skips operations associated with the kernel coefficient that are zero.

BRIEF DESCRIPTION OF THE DRAWINGS

FIG. 11 illustrates an example of using a look-up table to represent a compressed kernel, according to one embodiment.

FIG. 13 is a flowchart illustrating a method of using compressed kernel data in a neural processor circuit, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural processor circuit for performing neural network operations using kernel data that is decompressed from compressed kernel data received from a memory external to the neural processor circuit. The neural processor circuit uses compressed kernels to transfer data within the neural processor circuit for reducing the bandwidth and/or increasing the number of kernel coefficients that can be stored in kernel memory with a limited size. The neural processor circuit includes multiple neural engines where each neural engine includes a kernel extract circuit to extract uncompressed kernel data from compressed kernel data, and a multiply-add (MAD) circuit for performing neural network operations on a portion of input data using the uncompressed kernel data. For sparse kernels having kernel coefficients that are zero, the MAD circuit may skip operations associated with zero kernel coefficients to reduce processing operations for more efficient processing.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
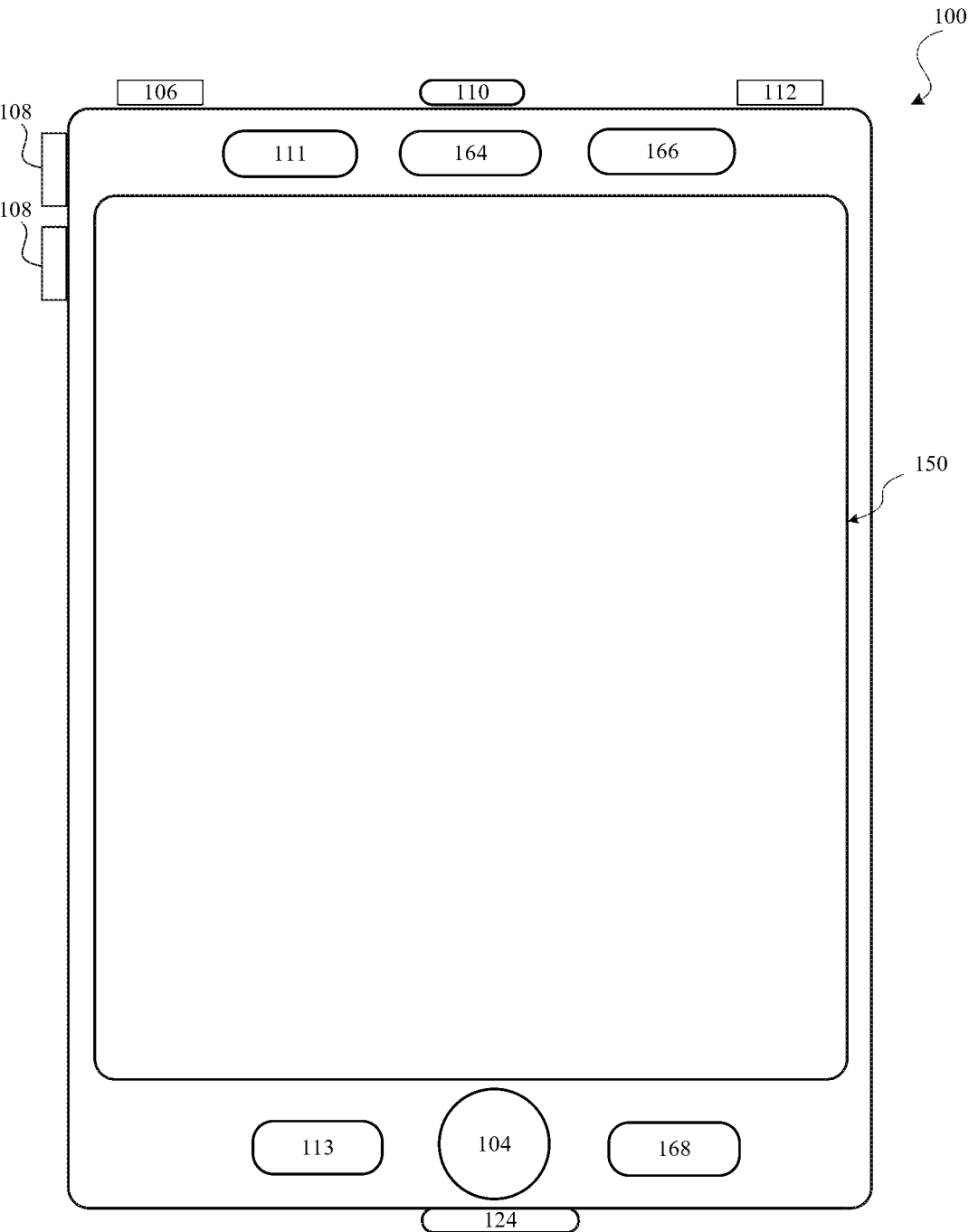
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
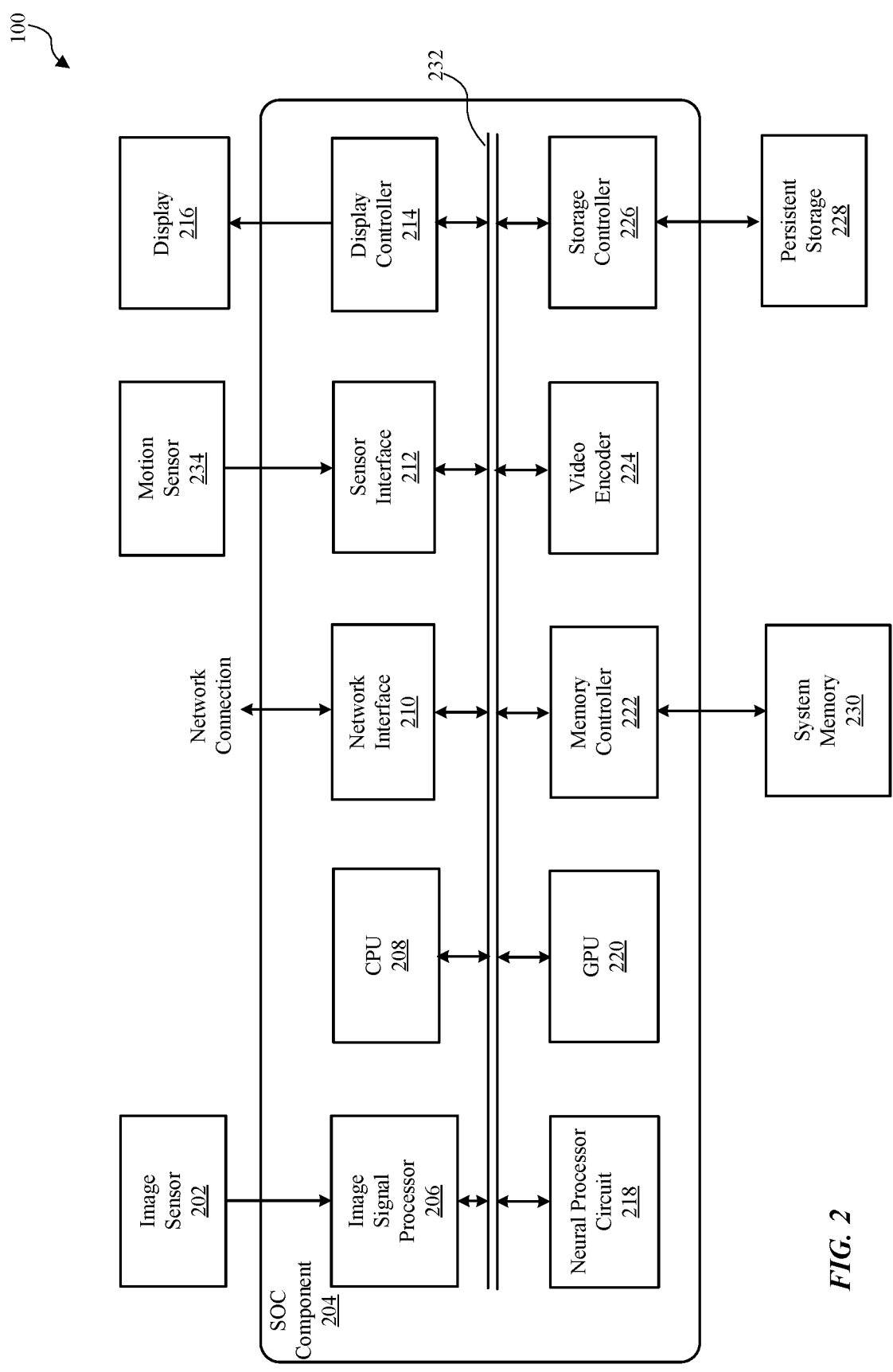
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computations including multiplication, adding and accumulation. Such computations may be arranged to perform, for example, convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 302, the image signal processor 206, system memory 230 or other sources such as network interface 210 or GPU 220. The output of neural processor circuit 218 may be provided to various components of device 100 such as the image signal processor 206, system memory 230 or CPU 208 for various operations. The structure and operation of neural processor circuit 218 is described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

Example Neural Processor Circuit

Neural processor circuit 218 is a configurable circuit that performs neural network operations on the input data based at least on kernel data 340. For this purpose, neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data buffer 318 and buffer DMA 320. Neural processor circuit 218 may include other components not illustrated in FIG. 3.

Each of neural engines 314 performs computing operations for neural network operations in parallel. Depending on the load of operation, entire set of neural engines 314 may be operated or only a subset of the neural engines 314 may be operated while the remaining neural engines 314 are placed in a power save mode to conserve power. Each of neural engines 314 includes components for storing one or more kernels, for performing multiply-accumulate operations, and for post-processing to generate an output data 328, as described below in detail with reference to FIG. 4. One example of a neural network operation is a convolution operation.

Figure 3:
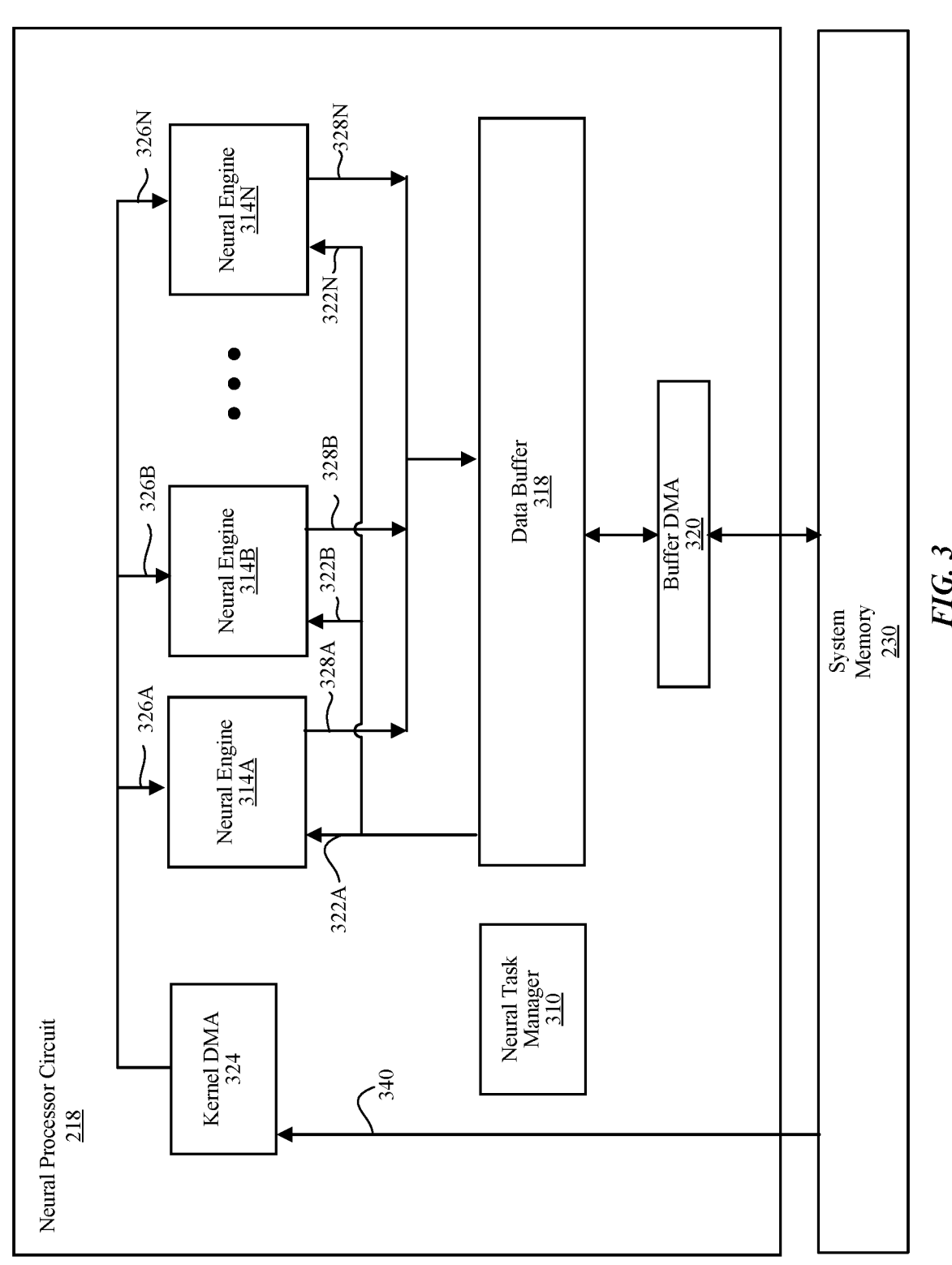
FIG. 3 is a block diagram illustrating a neural processor circuit, according to one embodiment.

Neural task manager 310 manages the overall operation of neural processor circuit 218. Neural task manager 310 may receive a task list from a compiler executed by CPU 208, store tasks in its task queues, choose a task to perform, and send instructions to other components of the neural processor circuit 218 for performing the chosen task. Neural task manager 310 may also perform switching of tasks on detection of events such as receiving instructions from CPU 208. In one or more embodiments, the neural task manager 310 sends rasterizer information to the components of the neural processor circuit 218 to enable each of the components to track, retrieve or process appropriate portions of the input data and kernel data, as described below in detail with reference to FIGS. 5 through 7. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances.

Data buffer 318 is a temporary storage for storing data associated with the neural network operations. In one embodiment, data buffer 318 is embodied as a memory that can be accessed by all of the neural engines 314. Data buffer 318 may store input data 322A through 322N for feeding to corresponding neural engines 314A through 314N, as well as output from each of neural engines 314A through 314N for feeding back into neural engines 314 or sending to a target circuit (e.g., system memory 230). The operations of data buffer 318 and other components of the neural processor circuit 218 are coordinated so that the input data and intermediate data stored in the data buffer 318 is reused across multiple operations at the neural engines 314, and thereby reduce data transfer to and from system memory 230. Data buffer 318 may be operated in a broadcast mode where data input data of all input channels are fed to all neural engines 314 or in a unicast mode where data input data of a subset of input channels are fed to each neural engine 314.

The input data 322 stored in data buffer 318 be part of, among others, image data, histogram of oriented gradients (HOG) data, audio data, meta data, output data 328 of a previous cycle of the neural engine 314, and other processed data received from other components of the SOC component 204.

Buffer DMA 320 includes a read circuit that receives a portion (e.g., tile) of the input data from a source (e.g., system memory 230) for storing in data buffer 318, and a write circuit that forwards data from data buffer 138 to a target (e.g., system memory).

Example Neural Engine Architecture

Figure 4:
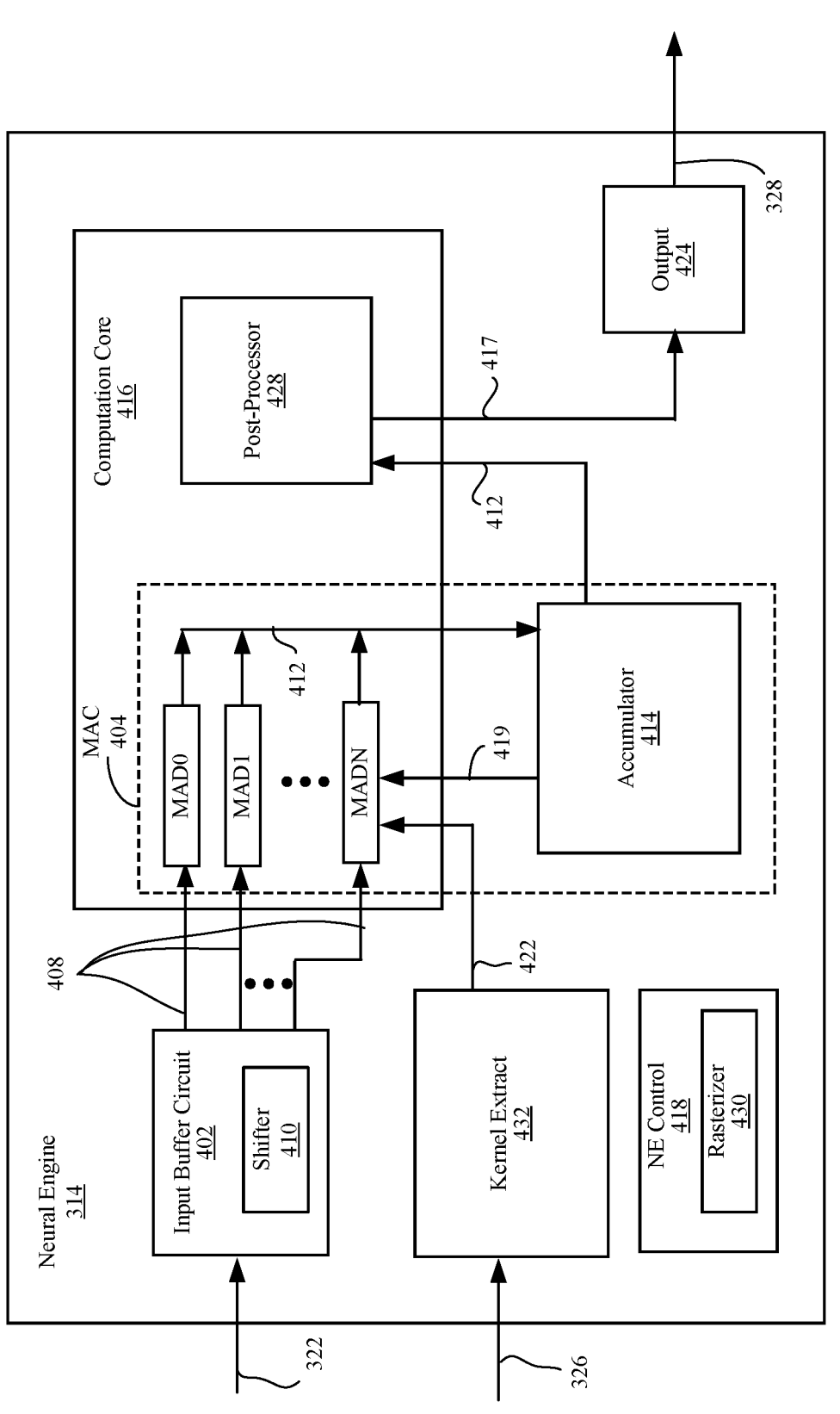
FIG. 4 is a block diagram of a neural engine in the neural processor circuit, according to one embodiment.

FIG. 4 is a block diagram of the neural engine 314, according to one embodiment. The neural engine 314 performs various operations to facilitate neural network operations such as convolution, spatial pooling and local response normalization. The neural engine 314 receives the input data 322, performs multiply-accumulate operations (e.g., convolution operations) on the input data 322 based on stored kernel data, performs further post-processing operations on the result of the multiply-accumulate operations, and generates the output data 328. The input data 322 and/or the output data 328 of the neural engine 314 may be of a single channel or multiple channels.

Neural engine 314 may include, among other components, input buffer circuit 402, computation core 416, neural engine (NE) control 418, kernel extract circuit 432, accumulators 414 and output circuit 424. Neural engine 314 may include further components not illustrated in FIG. 4.

Input buffer circuit 402 is a circuit that stores a portion of the input data 322 as it is received from the data buffer 318 and sends an appropriate portion 408 of input data for a current task or process loop to computation core 416 for processing. Input buffer circuit 402 includes a shifter 410 that shifts read locations of input buffer circuit 402 to change the portion 408 of input data sent to computation core 416. By changing portions of input data provided to the computation core 416 via shifting, neural engine 314 can perform multiply-accumulate for different portions of input data based on fewer number of read operations. In one or more embodiments, the input data 322 includes data of different convolution groups and/or input channels.

Kernel extract circuit 432 is a circuit that receives kernel data 326 from kernel DMA 324 and extracts kernel coefficients 422. In one embodiment, the kernel extract circuit 432 references a look-up table (LUT) and uses a mask to reconstruct a kernel from compressed kernel data 326. The mask indicates locations in the reconstructed kernel to be padded with zero and remaining locations to be filled with numbers. The kernel coefficients 422 of the reconstructed kernel are sent to computation core 416 to populate register in multiply-add (MAD) circuits of computation core 416. In other embodiments, the kernel extract circuit 432 receives kernel data in an uncompressed format and the kernel coefficients are determined without referencing a LUT or using a mask.

Computation core 416 is a programmable circuit that performs computation operations. For this purpose, the computation core 416 may include MAD circuits MAD0 through MADN and a post-processor 428. Each of MAD circuits MAD0 through MADN may store an input value in the portion 408 of the input data and a corresponding kernel coefficient in the kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to MAC circuit while data stored in a second subunit of accumulator 414 is sent to post-processor 428.

Post-processor 428 is a circuit that performs further processing of values 412 received from accumulator 414. The post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from the post-processor 428 as processed values 417 to output circuit 424.

NE control 418 controls operations of other components of the neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post processor 428. To configure components of the neural engine 314 to operate in a desired manner, the NE control 418 sends control signal to components of the neural engine. NE control 418 may also include rasterizer 430 that tracks the current task or process loop being processed at neural engine 314, as described below in detail with reference to FIG. 5 through 7.

Output circuit 424 receives processed values 417 from the post-processor 428 and interfaces with data buffer 318 to store processed values 417 in data buffer 318. For this purpose, output circuit 424 may send out as output data 328 in a sequence or a format that is different from the sequence or format in which the processed values 417 are processed in post-processor 428.

The components in the neural engine 314 may be configured during a configuration period by the NE control 418 and the neural task manager 310. For this purpose, the neural task manager 310 sends configuration information to the neural engine 314 during the configuration period. The configurable parameters and modes may include, but are not limited to, mapping between input data elements and kernel elements, the number of input channels, the number of output channels, performing of output strides, and enabling/selection of post-processing operations at the post processor 428.

Operation of Segmenting of Data for Processing at Neural Processor Circuit

Input data is typically split into smaller pieces of data for parallel processing at multiple neural engines 314. Often multiple cycles of operations are performed to generate output for a task associated with a neural network. A compiler executed by CPU 208 analyzes the hierarchy and nodes of the neural network and determines how the input data is to be segmented based on the hardware constraints of the neural processor circuit 218. One of functions of the compiler is to determine how input data is to be split into smaller data units for processing at the neural engines 314, and how the processing is to be iterated in loops to produce the result for tasks.

Figure 5:
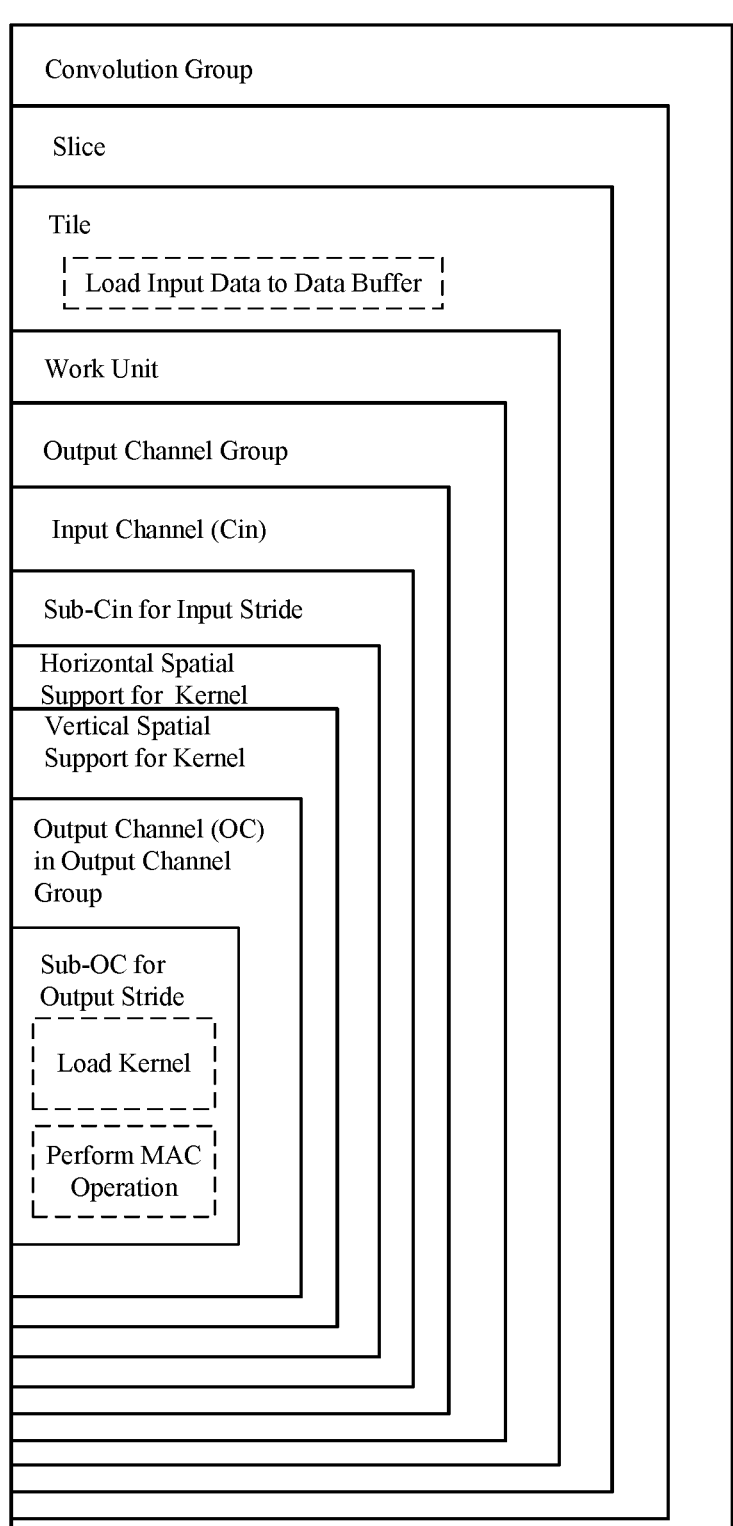
FIG. 5 is a conceptual diagram illustrating loops for processing input data at the neural processor circuit, according to one embodiment.

FIG. 5 is a conceptual diagram illustrating loops for processing the input data at neural processor circuit 218, according to one embodiment. The outermost loop represents processing for a convolution group, if group convolution involving multiple convolution group is used. Group convolutions are convolutions where input data of the input channels in each group are used only for generating output data of output channels of each group but are not used for generating output data for output channels of other groups. Hence, each group of the group convolution can be treated as a separate convolution operation.

Figure 6:
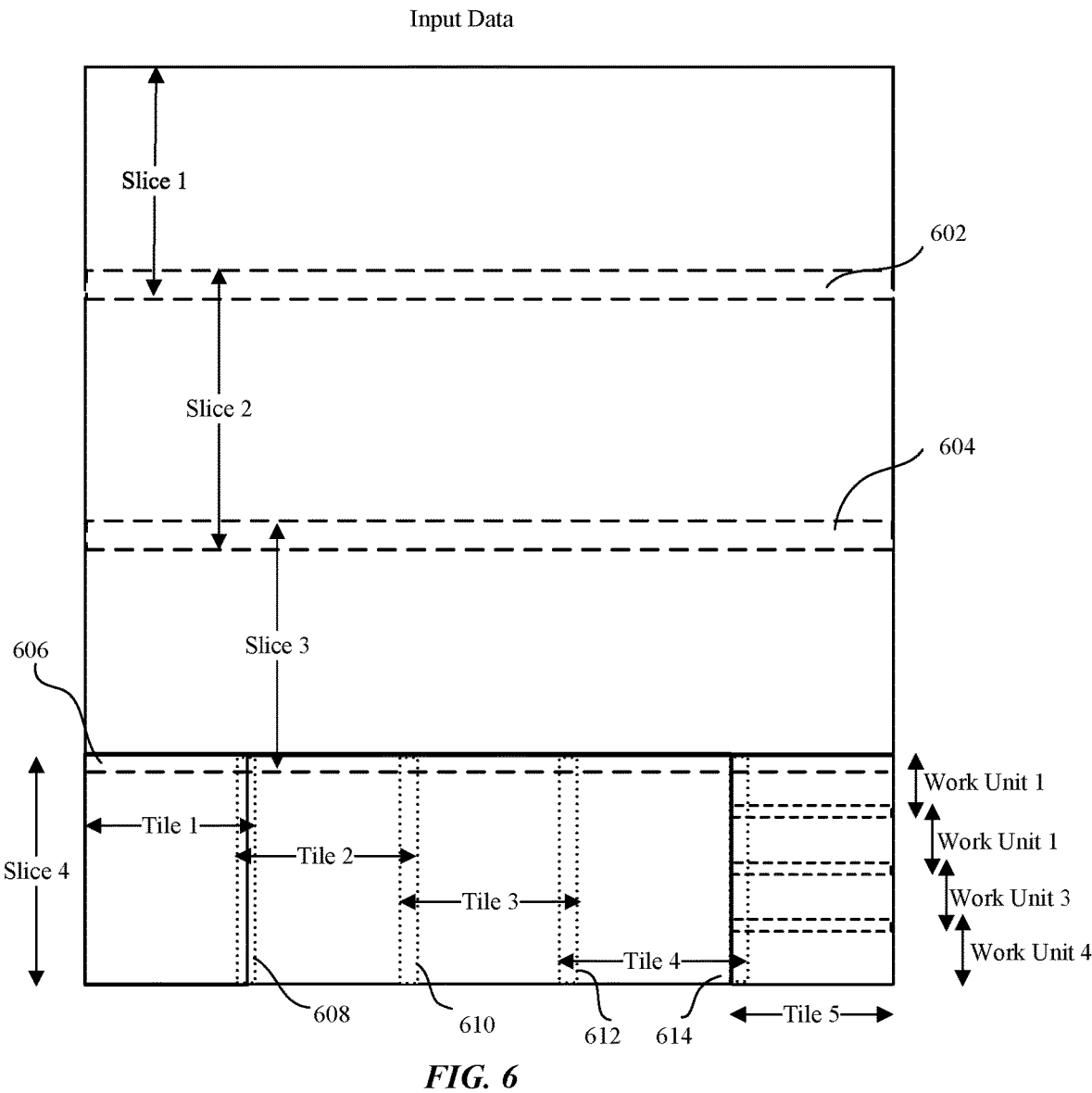
FIG. 6 is a conceptual diagram illustrating segmenting the input data into slices, tiles and work units, according to one embodiment.

In the loop for each convolution group is a processing loop for a slice of the input data. The entire input data for a convolution operation is segmented into multiple strips of slices in an overlapping manner, as shown in FIG. 6. The overlapping portions 602, 604, 606 are parts of the input data that are overfetched in two adjacent slices to provide spatial support for a corresponding kernel. The second outermost loop performs convolution operation for each slice in the input data. Within the loop for a slice is a processing loop for a tile of the slice. Each slice is segmented into a plurality of tiles, as shown in FIG. 6. The overlapping portions 608, 610, 612, 614 are parts of the input data in slice 4 that are overfetched in two adjacent tiles to provide spatial support for a corresponding kernel. The rightmost tile will typically have a width smaller than other tiles of the slice. In one embodiment, input data for each tile is loaded onto data buffer 318 in a read cycle and reused for operations in processing loops for the tile. In the processing loop for the tile is a processing loop for a work unit. Each tile is segmented into multiple work units as shown in FIG. 6. A work unit is a portion of the input data having a size that produces output values that fit into accumulator 414 of neural engine 314 during a single cycle of the computation core 416. Although the shape of each work unit is shown as a horizontal strip in FIG. 6, the shape of the work unit can be different depending on the shape and size of the tile. The work units also have overlapping parts that represent overfetched to provide support for a corresponding kernel. Especially, work units for the last tile of a slice may have a shape of a vertical strip if the tile is tall. In one or more embodiments, the size of each work unit is 256 bytes. In such embodiments, for example, work units can be shaped to one of 16×16, 32×8, 64×4, 128×2 or 256×1 dimension.

For each work unit, an internal processing loop may be provided for an output channel group (OCG). The number of output channels produced for a given work unit by a single cycle of the computation core 416 is referred to as an OCG. Depending on operation modes, each neural engine 314 may process output data of different numbers of output channels (e.g., 8 channels, 32 channels) for a single load of input data into its input buffer circuit 402.

For each output channel group, an internal processing loop may be provided for an input channel (Cin). If an input stride is implemented to skip certain input data, loops for sub-input channels (Sub-Cin) may be provided within the processing loop for the input channel (Cin).

For each input channel or each sub-input channel, internal loops are provided for processing horizontal spatial support for a kernel and the vertical support within each horizontal spatial support. The spatial support refers to the input data for convolution with the kernel, and includes overfetched input data for performing convolution at the edges of the input data.

Overfetch refers to fetching additional input data in current slice, tile or work unit so that proper dimension of input data can be provided for convolution with a kernel. In one or more embodiments, overfetch is performed vertically between slices to obtain additional rows of input data (shown as overlapping portions 602, 604, 606 in FIG. 6), horizontally between tiles to obtain additional columns of input data (shown as overlapping portions 608, 606, 612, 614 in FIG. 6), and vertically between work units within a tile to obtain additional rows of input data.

For each spatial support for the kernel, an internal processing loop for an output channel (OC) is provided to generate output data for each output channel (Cout). In cases where output stride implements a spatial up sampling, an additional inner loop for processing each sub-output channel is provided. Loading of kernel coefficients and MAC operations are performed within the loop for the output channel (OC) or sub-output channel if an output stride is implemented, to generate output data for the output channel (OC) or sub-output channel.

The nested loop structure of FIG. 5 is merely illustrative. Loops may be omitted, added or structured differently depending on various factors. For example, if only a single convolution group is used, the outermost loop may be removed. Further, the loop structure for the horizontal spatial support and the vertical spatial support may be reversed.

In one or more embodiments, the operations associated dividing the input space into smaller units and processing these smaller units as described above with reference to FIGS. 5 and 6 are performed by rasterizers 714, 718, 720, 722 in various components of neural processor circuit 218. A rasterizer is a circuit in various components of neural processor circuit 218 that keeps track of the segment of the input/output data (e.g., group, work unit, input channel, output channel) and instructs the components of neural processor circuit for proper handling of the segment of the input data. For example, rasterizer 720 in buffer DMA 320 tracks tiles and slices received from system memory 230 while rasterizer 718 in data buffer 318 broadcasts in sequence work units for processing by the neural engines 314. Rasterizer 724 in kernel DMA 324 determines which kernels are to be received and distributed to neural engines 314, while rasterizers 714 in neural engines 314 operate shifters 410 in input buffer circuits 402 to forward correct portions 408 of input data to MAC 404, and send the finished output data 328 to the data buffer 318.

Figure 7:
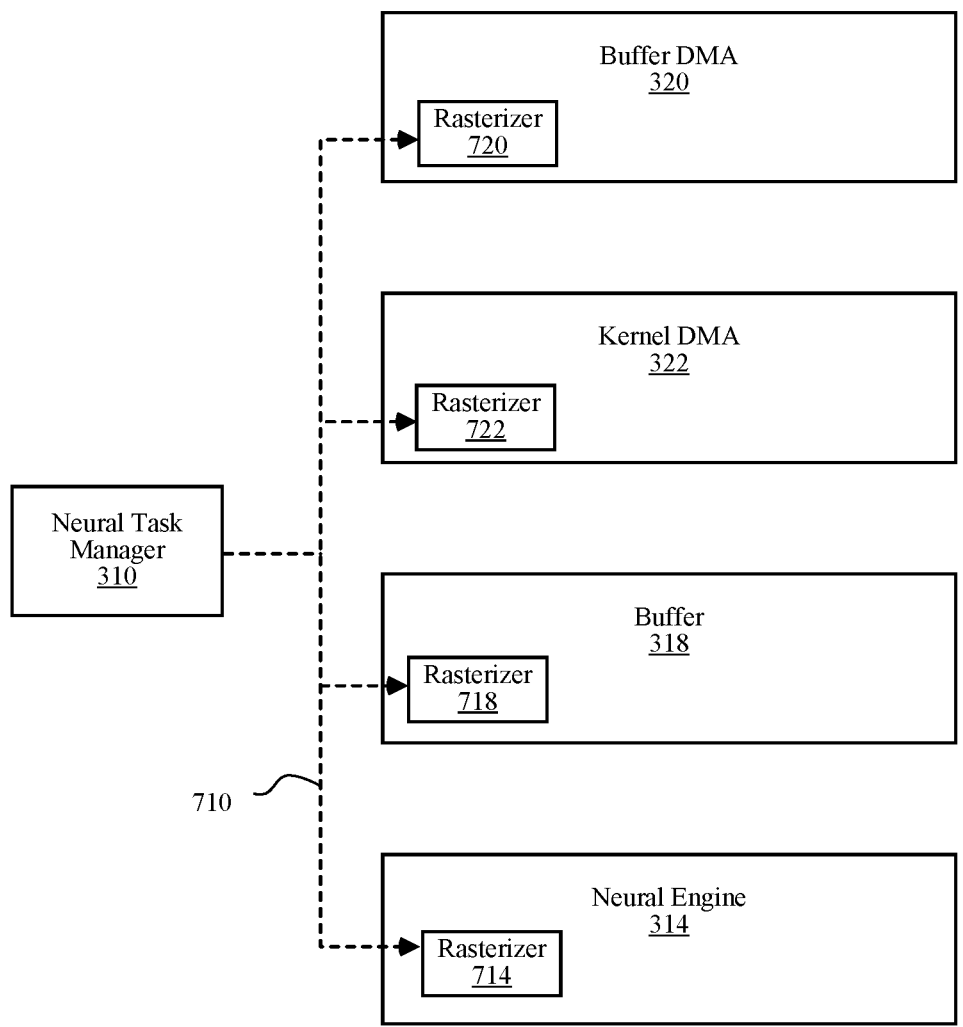
FIG. 7 is a diagram illustrating programming of rasterizers in components of the neural processor circuit, according to one embodiment.

FIG. 7 is a diagram illustrating programming of rasterizers 714, 718, 720, 722 in components 314,318,320,322 of the neural processor circuit 218, according to one embodiment. To perform their functions, each of rasterizers 714, 718, 720, 722 receives task information 710 indicating how the input data and/or kernel data are to be segmented and to be handled by each component of the neural processor circuit 218. The task information includes information about particulars of the current layer (e.g., dimensions of input and output data, dimension of an associated kernel, types of padding at the boundaries of input data). Rasterizers 714, 718, 720, and 722 may also receive constraints on their operations (e.g., whether to allow or disallow tile width over a threshold).

By providing rasterizers in different components of neural processor circuit 218, overhead in data transmitted between the components of the neural processor circuit 218 may be reduced. If a single central rasterizer is provided to control different components of the neural processor circuit 218, kernel data, input data, and output data transmitted between the components may be needed in these data to identify associated position in the loops of the task such as convolution group, tile, slice, work unit, input channel and output channel. By using distributed rasterizers, no separate metadata is needed to transmit the kernel data, input data and output data among components of the neural processor circuit 218.

Example Process at Neural Engine Architecture

Figure 8:
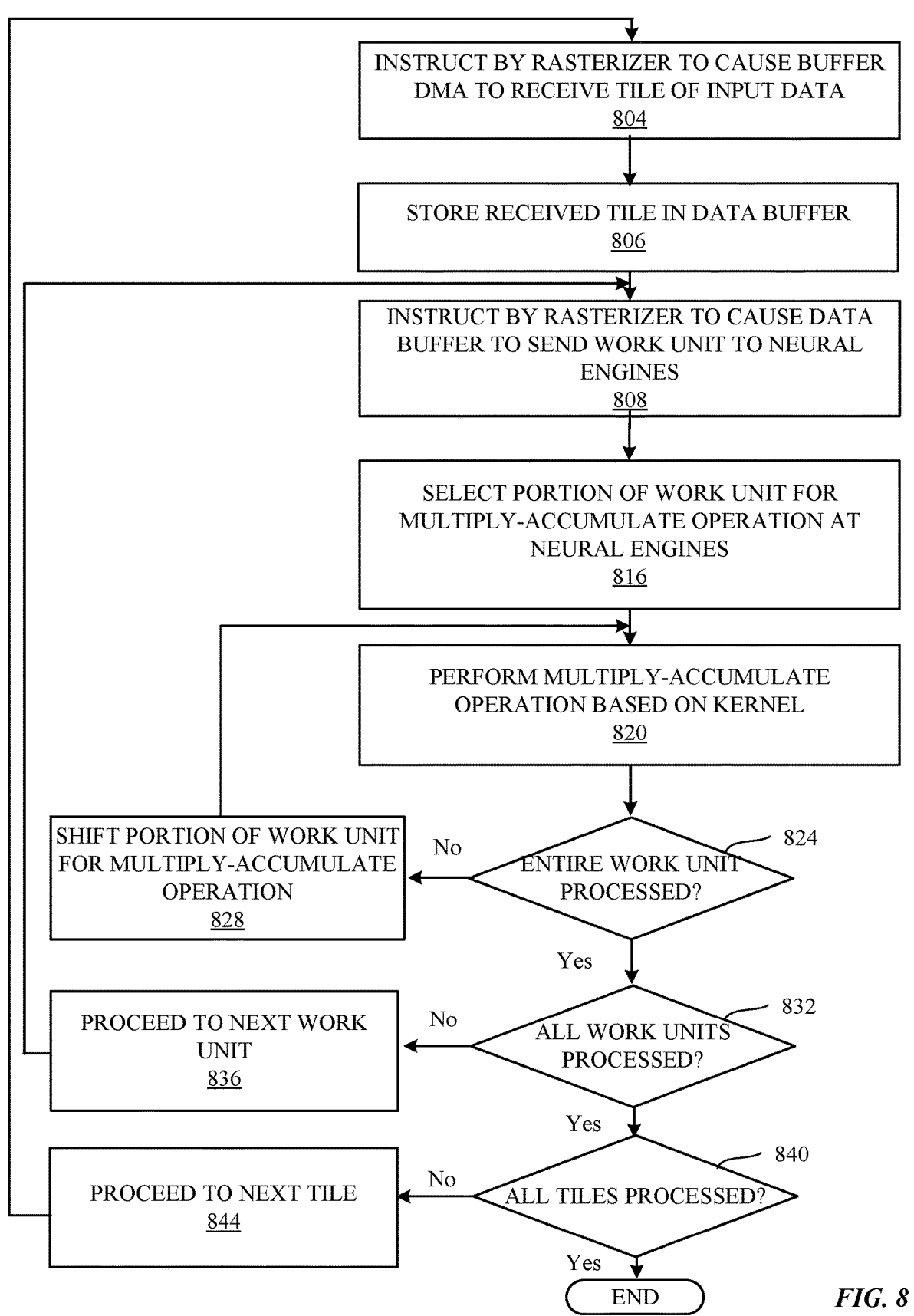
FIG. 8 is a flowchart illustrating a method of processing input data in a neural processor circuit, according to one embodiment.

FIG. 8 is a flowchart illustrating a method of processing input data in neural processor circuit 218, according to one embodiment. After neural task manager 310 programs rasterizers 714, 718, 720, 722, the process of operating buffer DMA 320 is initiated by rasterizer 720 instructing 804 buffer DMA 320 to cause buffer DMA 320 to receive a tile of input data from system memory 230. The tile received by buffer DMA 320 is stored 806 in data buffer 318.

Rasterizer 718 in data buffer 318 then instructs 808 data buffer 318 to send a work unit to one or more neural engines 314. The work unit is then stored in input buffer circuits 402 of the one or more neural engines 314.

In one or more embodiments, input buffer circuit 402 selects 816 a portion of work unit to be sent to MAC 404 to perform multiply-accumulate operation. Then MAC 404 performs 820 multiply-accumulate operations on the selected portion of the work unit using a corresponding kernel. Then it is determined 824 if the entire work unit is processed at one or more neural engines 314. If not, the selected portion of the work unit is shifted 828 by shifter 410 and returns to perform 820 another round of multiply-accumulate operations.

If it is determined 824 that the entire work unit was processed, then it proceeds to determine 832 if all work units in the tile was processed. If not, then the process proceeds 836 to the next work unit by having data buffer 318 send 808 a next work unit to one or more neural engines 314, and repeats the subsequent processes.

If it is determined 832 that all work units in the tile was processed by the neural engines 314, the process proceeds to determine 840 whether all tiles for the input data were processed. If not, the process proceeds 844 to a next tile by having rasterizer 720 instructs 804 buffer DMA 320 to receive a next tile from system memory 230 and repeats the subsequent processes.

If it is determined 840 that all tiles of the input data are processed, then the process ends for the current input data. Then, the process may repeated to process the next input data or proceed to the next task.

Embodiments of the process as described above with reference to FIG. 8 are merely illustrative. Further loops may be embodied, as described above with reference to FIG. 5. Moreover, sequence of the process may be modified or omitted.

Example Compression Scheme of Kernel Data

In one embodiment, the neural engine 314 receives compressed kernel data (e.g., kernel data 326) from system memory 230 via kernel DMA 324. The compressed kernel data may include indexes of the LUT that indicate representative values approximating kernel coefficients, and identification of a mask that indicates locations of non-zero coefficients in the kernel. After the kernel data is received at neural engine 314, the compressed kernel data is decompressed by the kernel extract circuit 432 and sent to the MAD circuits for multiply and add operations.

The details of the compression scheme such as representative values in the look up table, and patterns of zero or non-zero coefficients to be represented by masks may be determined by a compiler during a compilation process of a neural network into a series of tasks for execution by the neural processor circuit 218, which is omitted herein for the sake of brevity.

By using compressed kernel data, reduced bandwidth may be used for transmitting the kernel data from system memory 230 to neural engines 314 while maintaining or increasing the speed of transmitting the kernel data to neural engines 314. Further, the amount of memory in components of the neural processor circuit 218 (other than the neural engines 314) for storing the kernel data may be reduced.

Masking Scheme for Sparse Kernels

Figure 9:
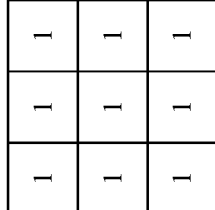
FIG. 9 depicts examples of kernels to illustrate the concept of sparse kernels, according to one embodiment.

A sparse kernel is a kernel that includes coefficients that are zero. FIG. 9 depicts examples of kernels to illustrate the concept of sparse kernels, according to one embodiment. Kernel 910 contains entries for each kernel coefficient and is not a sparse kernel. In contrast, kernels 920, 930 include coefficients that are zero, and are examples of sparse kernels. A sparse matrix can be compressed by representing the non-zero entries in a matrix as mask. For more efficient processing, the neural engine 314 can reduce the number of execution cycles and save power when performing operations associated with sparse kernels 920 and 930 by only performing an operation (e.g., multiplication with corresponding input data) if a kernel coefficient is non-zero. In this example, the kernels 910, 920, and 930 have a same number of non-zero entries. A neural engine 314 can use the same number of cycles (e.g., multiplication) for operations associated with the different sized kernels 910, 920, and 930 by skipping operations of kernel coefficients that are zero. In this way, processing of kernels 920 and 930 that are sparse kernels can be made more efficient.

Figure 10A:
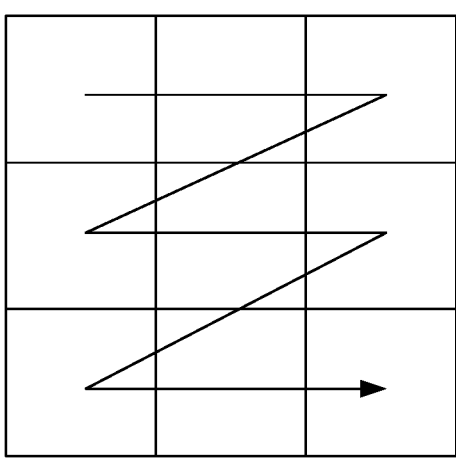
FIG. 10A shows an example rasterization order of a kernel, according to one embodiment.

The number and locations of non-zero coefficients can be represented by a mask. The mask indicates positions of the sparse kernel with a coefficient that is zero. FIG. 10A shows an example rasterization order of a kernel, according to one embodiment. The kernel shown in FIG. 10A is rasterized from one corner (e.g., a top left position) to an opposite corner (e.g., bottom right position) to be represented by a mask. The top left position in the kernel corresponds to a least significant bit (LSB) in the mask and a bottom right position in the kernel corresponds to a most significant bit (MSB) in the mask. In other embodiments, different rasterization orders may be used.

Figure 10B:
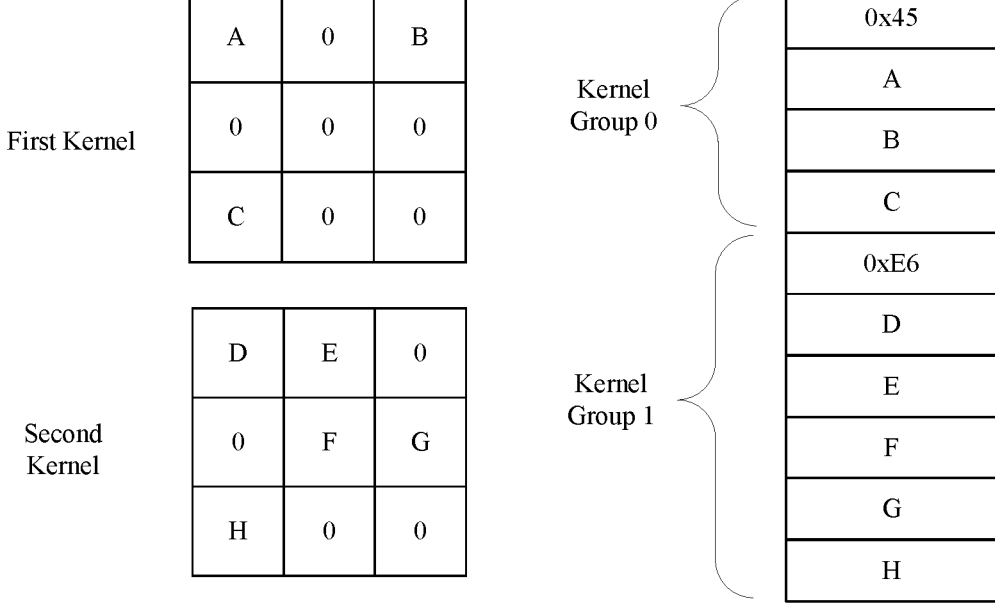
FIG. 10B illustrates example masks indicating non-zero locations in a sparse kernel, according to one embodiment.

FIG. 10B illustrates an example of masks to represent non-zero locations in a sparse kernel, according to one embodiment. FIG. 10B includes a first kernel and a second kernel that are sparse kernels. Each sparse kernel, in this example, is a 3×3 matrix. The first kernel and second kernel can be flattened into a linear array using the rasterization order shown in FIG. 10A. The first kernel has coefficients that are non-zero in positions "101000100" with a "1" indicating the presence of a non-zero, when rasterized in the order shown in FIG. 10A. The second kernel has coefficients that are non-zeros in positions "110011100" with a "1" indicating the presence of a non-zero, when rasterized in the fashion shown in FIG. 10A. The first kernel data "101000100" and the second kernel data "110011100" can be concatenated to form the bit string "101000100110011100" representing flattened kernel data.

In some embodiments, the each mask may represent a specific number of kernel coefficients. For example, a mask may indicate the non-zero locations of eight kernel coefficients. In the example shown in FIG. 10B, the flattened kernel data "101000100110011100" can be divided in to three masks of "10100010", "01100111", and "00". A first mask can represent the first eight positions of the first kernel "10100010", or in MSB to LSB order "01000101", represented by "0x45". The second mask represents the last entry of the first kernel "0" in addition to the next seven positions of the second kernel "1100111" which is "01100111", or in MSB to LSB order, "11100110" represented by the mask "0xE6". A third mask represents the last two locations in the second kernel which is "00". In this case, the third mask may not be used because it is all zero entries. If the second kernels had non-zero entries in the last two locations of the second kernel, these non-zero entries could be represented by a third mask.

In one embodiment, kernels may be compressed in kernel groups, with each kernel group including a mask indicating the non-zero locations of a number of kernel coefficients (e.g., 8-bit mask representing non-zero locations of 8 kernel coefficients) and up to a same number of non-zero kernel coefficients (e.g., up to 8 non-zero kernel coefficients). For the example shown in FIG. 10B, a kernel group 0 is represented by first mask "0x45" followed by non-zero coefficients A, B, and C. A kernel group 1 can be represented by mask "0xE6" followed by non-zero coefficients D, E, F, G, and H.

The embodiment described in FIGS. 10A and 10B relate to compressing two kernels with a kernel width of 3 and kernel height of 3. The two kernels (e.g., corresponding to two input channels) is a three dimensional object that is flattened into a linear array and compressed into kernel groups. Each kernel group includes a mask representing non-zero locations of a number of kernel coefficients followed by up to a same number of non-zero kernel coefficients. In other embodiments, kernels may correspond to a different number of dimensions. For example, a kernel may be a four dimensional object (e.g., number of output channels, number of input channels, kernel width, and kernel height). The kernel can be flattened into a linear array, and the order of flattening the kernel can vary. The flattened linear array can be compressed into kernel groups.

Compressed Kernel Data with a Look-Up Table (LUT)

A kernel includes kernel coefficients (e.g., full precision coefficients) that may be represented by a set of representative kernel coefficients (e.g., reduced number of coefficients and/or lower precision coefficients). The representative kernel coefficients may be determined during a compilation process based on kernel coefficients of original kernel data that are frequently encountered. A LUT includes the representative kernel coefficient, each representative kernel coefficient associated with a corresponding index. The compressed kernel data can include coefficients (e.g., indexes of the LUT) to represent actual values in a look-up table corresponding to a representative kernel coefficient.

FIG. 11 illustrates an example of using a look-up table (LUT) to represent a compressed kernel, according to one embodiment. The representative kernel coefficients in the LUT can be produced during the compilation process by using an algorithm such as computing N local means for a dataset that produces a minimum error. Other algorithms such as linear quantization could also be used to produce the representative kernel coefficients of the kernel. In this example, the kernel shown on the left is a 3×3 matrix that includes full precision coefficients. The full precision coefficients (e.g., nine entries in the kernel) are represented by the four entries in the LUT as indexes in the LUT (e.g., compressed coefficients). The compressed coefficients (e.g., LUT indexes) can be decompressed by referencing the LUT to restore the representative coefficients of the LUT.

In this example, the full precision coefficients of an original kernel include nine values −0.044, 0.021, −0.012, 0.022, −0.030, 0.001, 0.007, −0.019, 0.052 (e.g., rasterized in an order of FIG. 10A). Four representative kernel coefficients may be −0.040, −0.011, 0.017 and 0.047. These representative values may be entries in a LUT, which are indexed by 0, 1, 2, and 3. The first entry in the original kernel is −0.044, which is closest to representative kernel coefficient −0.040. Thus, the first entry in the original kernel of −0.044 can be compressed to index value 0 of the LUT corresponding to representative kernel coefficient −0.040. The second full precision coefficient value 0.021 is closest to representative kernel coefficient 0.017. Thus, the second entry in the original kernel of 0.021 can be compressed to index value 2 of the LUT corresponding to representative kernel coefficient 0.017. The third full precision coefficient value −0.012 is closest to representative kernel coefficient −0.011. Thus, the third entry in the original kernel of −0.012 can be compressed to index value 1 of the LUT corresponding to representative kernel coefficient −0.011, and so on. In this way, the full precision coefficients of the original kernel −0.044, 0.021, −0.012, 0.022, −0.030, 0.001, 0.007, −0.019, 0.052 can be represented by a compressed kernel with compressed coefficients 0, 2, 1, 2, 0, 1, 2, 1, 3 corresponding to indexes of the LUT. The compressed kernel can be restored by referencing the LUT using the compressed coefficients as an index to the LUT. For example, the first entry in the compressed kernel of 0 used as an index to the LUT produces the uncompressed coefficient −0.040. When the compressed coefficients are restored to uncompressed coefficients of the uncompressed kernel, the uncompressed coefficients include values −0.040, 0.017, −0.011, 0.017, −0.040, −0.011, 0.017, −0.011, 0.047.

The examples shown in FIGS. 10 and 11 show kernels that are 3×3 matrixes by way of example only. The kernel may be of different sizes and shape. Further, different numbers of representative coefficients can be used.

As previously described in reference to FIG. 10B, the compressed version of kernel data 326 can be represented by kernel groups. In this embodiment, each kernel group includes a mask indicating the non-zero locations of a number of kernel coefficients and up to a same number of non-zero kernel coefficients indicating an index of a coefficient in a look-up table (LUT) instead of an actual value of the coefficient. Revisiting the example shown in FIG. 10B, a first kernel group can include the mask "0x45" followed by coefficients A, B, and C. A second kernel group can include the mask "0xE6" followed by coefficients D, E, F, G, and H. The coefficients A-H indicate a location in a LUT (e.g., index) corresponding to a representative coefficient that corresponds to a full-precision coefficient.

Example Kernel Extract Circuit

Figure 12:
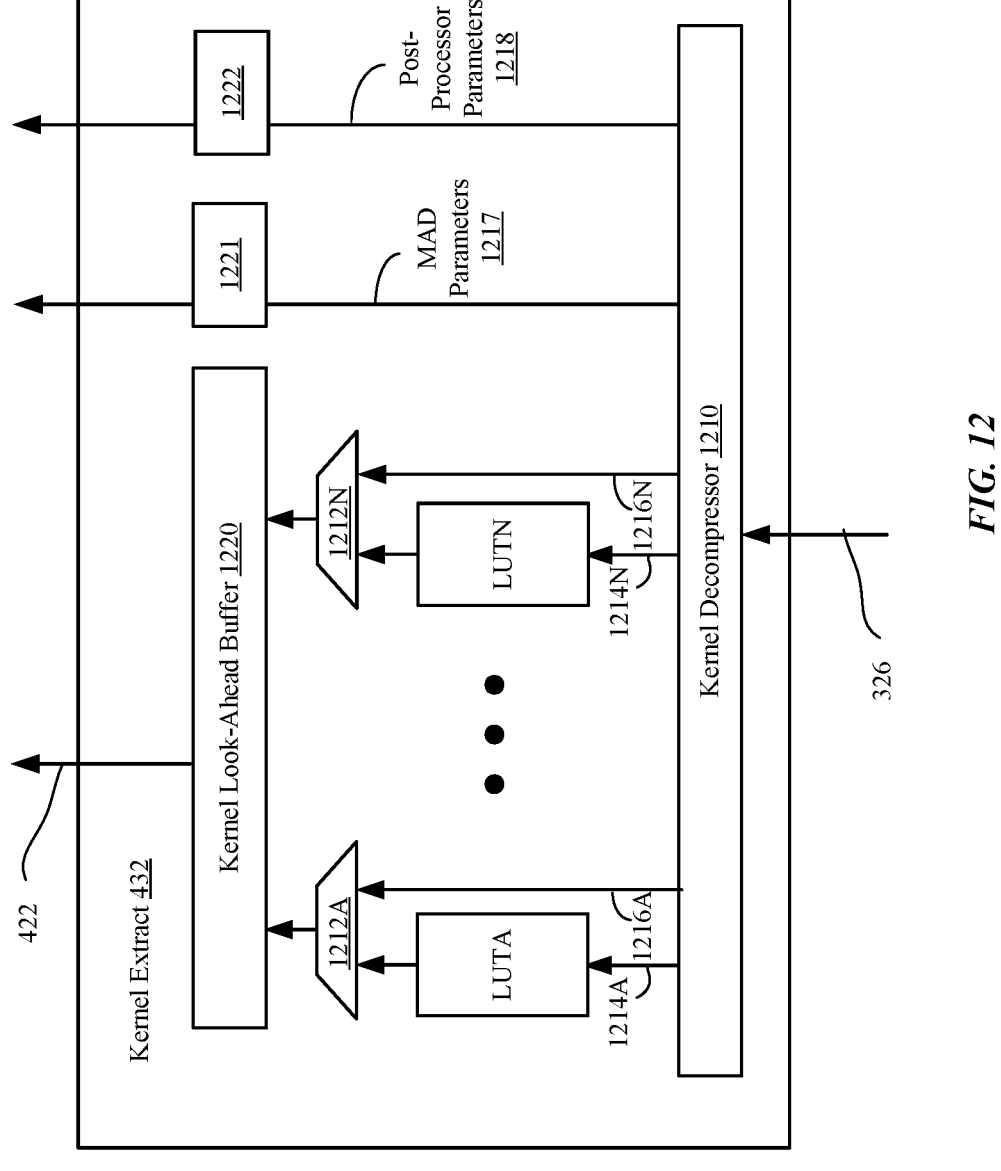
FIG. 12 is a block diagram illustrating a kernel extract circuit, according to one embodiment.

FIG. 12 is a block diagram illustrating a kernel extract circuit, according to one embodiment. In this embodiment, a kernel DMA 324 circuit reads a compressed version of kernel data 326 from system memory 230. The kernel extract circuit 432 receives the compressed kernel data 326 from the kernel DMA 324 circuit and extracts an uncompressed version of kernel coefficients 422. The kernel extract circuit 432 extracts the uncompressed kernel data by using masks indicating locations in the uncompressed kernel data where kernel coefficients are zero or non-zero.

The kernel extract circuit 432 may include, among other components, a kernel decompressor 1210, look-up table storage LUTA through LUTN, reconstruction modules 1212A through 1212N, a kernel look-ahead buffer 1220, MAD parameter buffer 1221, and post-processor parameter buffer 1222. The kernel extract circuit 432 may include fewer or additional components than the components illustrated in FIG. 12.

The kernel decompressor 1210 is a circuit that separates the compressed kernel data 326 and sends it to other components of the kernel extract circuit 432. The kernel decompressor 1210 may extract LUT information 1214A through 1214N, LUT identification 1216A through 1216N, MAC parameters 1217, and post-processor parameters 1218 from the compressed kernel data 326.

The kernel decompressor 1210 sends the LUT identification 1216A through 1216N to a corresponding look-up table storage LUTA through LUTN. Each LUT information 1214A through 1214N may include identifications and representative kernel coefficient for multiple LUTs. Each LUT identification 1216A through 1216N may indicate the identification of a LUT (of multiple LUTs) to be used, indices for representative kernel coefficients and mask information, as described above with reference to FIGS. 10B and 11.

The kernel decompressor 1210 sends MAD parameters 1217 to the MAD parameter buffer 1221. The MAD parameters 1217 are sent to the MAD circuit of each of the neural engine circuits to configure operations of the MAD circuit.

For example, a MAD parameter 1217 includes a channel bias or a shift to be used with an operation.

The kernel decompressor 1210 sends post-processor parameters 1218 to post-processor parameter buffer 1222. Post-processing parameters 1218 are sent to a post-processer (e.g. post-processor 428) of each of the neural engine circuits to configure operations of the post-processor. For example, a post-processing parameter 1218 is values that collectively represent a function used for processing values 412 generated by the MAC 404.

The LUT storage LUTA through LUTN stores look-up tables storing representative kernel coefficients of kernels identified by index values. The LUT storage LUTA through LUTN receives LUT information 1214A through 1214N from the kernel decompressor circuit 1210.

The reconstruction circuit 1212A through 1212N reconstructs uncompressed kernel data for each of the neural engine circuits 314. The reconstruction circuit 1212 references a LUT identified by a corresponding LUT identification 1216A through 1216N in the look-up table storage LUTA through LUTN to determine representative coefficient values to be filled in non-zero coefficient locations as indicated by the mask. The reconstruction circuit 1212A through 1212N sends the uncompressed kernel data to a kernel look-ahead buffer 1220 for storage.

The kernel look-ahead buffer 1220 stores uncompressed kernel data. The kernel look-ahead buffer 1220 receives uncompressed kernel coefficients from the reconstruction circuits 1212A through 1212N. The kernel look-ahead buffer sends information on locations of kernel coefficients that are zero in the uncompressed kernel data to a MAD circuit (e.g., MAD0 through MADN) in advance before sending remaining kernel coefficients that are non-zero to the MAD circuit so that the MAD circuit can skip multiply-add operations associated with the kernel coefficient that are zero.

In one embodiment, the kernel look-ahead buffer 1220 can be used to generate relevant control signals (e.g., control signals 419) for a computation core 416 in a neural engine 314. The control signals may instruct then neural engine 314 to skip operations for kernel coefficients that have zero values. For example, the look-ahead buffer 1220 may have information of the locations of zero entries in a kernel. Thus, control signals may be generated for the neural engine 314 to skip an operation for MAD0 fora particular location in the kernel. Thus, instead of sequentially stepping through each kernel location of the kernel to perform an operation with the kernel coefficient associated with the kernel location, operations associated with the zero entries can be skipped.

Compressed Kernel Data for a Neural Processor Circuit

FIG. 13 is a flowchart illustrating a method of using compressed kernel data for a neural processor circuit, according to one embodiment. The neural processor circuit (e.g., neural processor circuit 218) includes a kernel access circuit (e.g., kernel DMA circuit 324) which reads 1304 compressed kernel data (e.g., kernel data 340) from external memory (e.g., system memory 230). This compressed kernel data may include a mask indicating locations in uncompressed kernel data where kernel coefficients are non-zero. The compressed kernel data may also include coefficients that are index values used to reference look-up tables storing representative kernel coefficients of kernels. The kernel access circuit sends the compressed kernel data to a plurality of neural engines circuits (e.g., neural engines 314) of the neural processor circuit.

Each of a plurality of neural engines receives 1306 compressed kernel data. Each of the neural engine circuits includes a kernel extract circuit (e.g., kernel extract circuit 432) that extracts 1308 the uncompressed kernel data from the compressed kernel data. The neural processor circuit performs 1310 neural network operations on a portion of input data using the uncompressed kernel data.

Embodiments of the process as described above with reference to FIG. 13 are merely illustrative. The sequence of the process may be modified.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A processor circuit, comprising:
an access circuit coupled to memory external to the processor circuit, the access circuit configured to read compressed kernel data from the memory, wherein the kernel data comprises kernel coefficients of a matrix, wherein the compressed kernel data comprises:
indices of a look up table (LUT), wherein the LUT is configured to store representative values having a first precision approximating the kernel coefficients having a second precision, wherein the LUT has fewer distinct representative values than a number of kernel coefficients of the kernel data, and
a mask value that indicates one or more locations of non-zero coefficients of the matrix in the kernel data;
an extract circuit coupled to the access circuit, the extract circuit configured to extract uncompressed kernel data from the compressed kernel data, wherein each of the uncompressed kernel data comprises a representative value selected from the representative values having the first precision stored in the LUT whose index is used as the compressed kernel data; and
a computation circuit coupled to the extract circuit and configured to receive the uncompressed kernel data, the computation circuit further configured to perform computation operations using the uncompressed kernel data.

2. The processor circuit of claim 1, wherein each of the computation operations is part of a convolution operation.

3. The processor circuit of claim 1, wherein the computation circuit skips one or more of the computation operations associated with coefficients that are zero.

4. The processor circuit of claim 1, further comprising additional computation circuits coupled to the extract circuit, each of the additional computation circuits configured to perform computation operations using the uncompressed kernel data.

5. The processor circuit of claim 4, wherein the extract circuit comprises:
a reconstruction circuit configured to reconstruct uncompressed kernel data corresponding to each of the computation circuit and the additional computation circuits, and
a look-ahead buffer configured to store the uncompressed kernel data.

6. The processor circuit of claim 5, wherein the look-ahead buffer is configured to send information on locations of coefficients that are zero in the uncompressed kernel data to the computation circuit before sending coefficients that are non-zero so that the computation circuit skips one or more operations associated with the coefficients that are zero.

7. The processor circuit of claim 1, wherein the extract circuit is further configured to extract, from the compressed kernel data, a parameter to configure the computation circuit.

8. The processor circuit of claim 7, wherein the extract circuit is further configured to extract, from the compressed kernel data, another parameter for configuring a post-processor circuit that performs an operation on a result of the computation operations.

9. The processor circuit of claim 1, wherein the extract circuit further comprises a look-up table storage configured to store the look-up table comprising the representative values identified by the indices and the representative values determined during a compilation process based on coefficients of original kernel data before compression.

10. The processor circuit of claim 1, wherein the compressed kernel data comprises a plurality of matrix groups, wherein each of the matrix groups includes a mask indicating non-zero coefficients of a single matrix.

11. A method of operating a processor circuit, comprising:
reading, by an access circuit, compressed kernel data from a memory external to the processor circuit, wherein the kernel data comprises kernel coefficients of a matrix, wherein the compressed kernel data includes:
indices of a look up table (LUT), wherein the LUT is configured to store representative values having a first precision approximating kernel coefficients having a second precision, wherein the LUT has fewer distinct representative values than a number of kernel coefficients of the kernel data, and
a mask value for the matrix indicative of one or more locations in the matrix where the kernel coefficients are non-zero;
extracting, by an extract circuit, uncompressed kernel data from the compressed kernel data using the mask value, wherein each of the uncompressed kernel data comprises a representative value selected from the representative values having the first precision stored in the LUT whose index is used as the compressed kernel data; and
performing, by a computation circuit, computation operations using the uncompressed kernel data.

12. The method of claim 11, wherein each of the computation operations is part of a convolution operation.

13. The method of claim 11, further comprising skipping one or more of the computation operations associated with coefficients that are zero.

14. The method of claim 11, further comprising performing additional computation operations using the uncompressed kernel data by additional computation circuits.

15. The method of claim 14, further comprising:
reconstructing the uncompressed kernel data corresponding to each of the computation circuit and the additional computation circuits, and
storing the uncompressed kernel data in a look-ahead buffer.

16. The method of claim 15, further comprising:
sending information on locations of coefficients that are zero in the uncompressed kernel data by the extract circuit to the computation circuit before sending coefficients that are non-zero so that the computation circuit skips one or more operations associated with the coefficients that are zero.

17. The method of claim 11, further comprising:

extracting, from the compressed kernel data, a parameter to configure the computation operations of the computation circuit.

18. The method of claim 17, further comprising:

extracting, from the compressed kernel data, another parameter for configuring a post-processor circuit that performs an operation on a result of the computation operations.

19. The method of claim 11, further comprising:

storing in the look-up tables the representative values identified by the indices, wherein the representative values are determined during a compilation process based on coefficients of original kernel data before compression.

20. An electronic device, comprising:

memory storing compressed kernel data; and a processor circuit coupled to the memory, the processor circuit comprising:

an access circuit coupled to the memory, the access circuit configured to read compressed kernel data from the memory, wherein the kernel data comprises kernel coefficients of a matrix, the compressed kernel data comprises:

indices of a look up table (LUT), wherein the LUT is configured to store representative values having a first precision approximating the kernel coefficients having a second precision, wherein the LUT has fewer distinct representative values than a number of kernel coefficients of the kernel data, and a mask value that indicates one or more locations of non-zero coefficients of the matrix in the kernel data;

an extract circuit coupled to the access circuit, the extract circuit configured to extract uncompressed kernel data from the compressed kernel data, wherein each of the uncompressed kernel data comprises a representative value selected from the representative values having the first precision stored in the LUT whose index is used as the compressed kernel data; and a computation circuit coupled to the extract circuit to receive the uncompressed kernel data, the computation circuit further configured to perform computation operations using the uncompressed kernel data.

* * * * *